US012184500B1

(12) United States Patent
Satyanarayana (10) Patent No.: US 12,184,500 B1
(45) Date of Patent: Dec. 31, 2024

(54) FETCHING TOPOLOGIES USING TIMESTAMP-CALLBACK MAP (71) Applicant: Shekhar Satyanarayana, San Jose, CA (US)

(72) Inventor: Shekhar Satyanarayana, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 19 days.

(21) Appl. No.: 18/338,563

(22) Filed: Jun. 21, 2023

(51) Int. Cl.
*H04L 51/02* (2022.01)
*H04L 41/12* (2022.01)

(52) U.S. Cl.
CPC .................................. *H04L 41/12* (2013.01)

(58) Field of Classification Search
CPC ........................................ H04L 41/12
USPC ......................................... 709/223
See application file for complete search history.

(56) References Cited

U.S. PATENT DOCUMENTS

| | | |
|---|---|---|
| 5,434,913 A | 7/1995 | Tung et al. |
| 5,490,247 A | 2/1996 | Tung et al. |
| 6,012,081 A | 1/2000 | Dorn et al. |
| 6,125,398 A | 9/2000 | Mirashrafi et al. |
| 7,350,184 B2 | 3/2008 | Upton |
| 8,863,091 B2 | 10/2014 | Dageville et al. |
| 11,023,896 B2 | 6/2021 | Zhou et al. |
| 11,064,042 B2 * | 7/2021 | de Waal .................. H04L 67/53 |
| 11,070,573 B1 | 7/2021 | Edwards |
| 2021/0084031 A1 | 3/2021 | Lao et al. |

FOREIGN PATENT DOCUMENTS

WO 95/15047 A2 6/1995

* cited by examiner

*Primary Examiner* — Lan T Truong
(74) *Attorney, Agent, or Firm* — Hewlett Packard Enterprise Patent Department (57) ABSTRACT

Examples described herein relate to fetching network device topologies using a timestamp-callback map. The timestamp-callback map includes timestamps paired with references to unique callback functions that fetch topologies for network devices when executed. Examples include setting an alarm for each timestamp in the timestamp-callback map. When an alarm generates a notification, examples create worker threads of a network profiler service. Each worker thread executes a respective unique callback function to fetch a topology for a network device from a topology service. Examples describe different implementations of the timestamp-callback map that can be optimized in various embodiments.

20 Claims, 5 Drawing Sheets

| 202 TIMESTAMP (TIME) | 204 CALLBACK REF |
|---|---|
| 206 1667362623 (8:00 AM) | [F1*, F2*, F3*, F4*] |
| 208 1667358962 (8:10 AM) | [F5*, F6*] |
| 210 1667359248 (8:22 AM) | [F7*] |
| 212 1667325499 (8:30 AM) | [F8*] |

302 — DETERMINE A TIMESTAMP FOR A CALLBACK FUNCTION, WHICH FETCHES A TOPOLOGY FOR A NETWORK DEVICE FROM A TOPOLOGY SERVICE

304 — INSERT A REFERENCE TO THE CALLBACK FUNCTION INTO AN ENTRY OF A TIMESTAMP-CALLBACK MAP, WHERE EACH ENTRY INCLUDES A LIST OF REFERENCES TO UNIQUE CALLBACK FUNCTIONS ASSOCIATED WITH THE TIMESTAMP

306 — CREATE, FOR THE UNIQUE CALLBACK FUNCTIONS, RESPECTIVE WORKER THREADS AT A TIME INDICATED IN THE TIMESTAMP, WHERE THE RESPECTIVE WORKER THREADS INVOKE THE UNIQUE CALLBACK FUNCTIONS TO FETCH TOPOLOGIES FOR NETWORK DEVICES FROM THE TOPOLOGY SERVICE

FETCHING TOPOLOGIES USING TIMESTAMP-CALLBACK MAP

BACKGROUND

A centralized network manager is a cloud application that provides a unified single point of control to Information Technology (IT) customers for managing and orchestrating all aspects of wired and wireless local area networks (LAN), wide area networks (WAN), and virtual private networks (VPNs) across campus, branch, remote, datacenter or other network sites. Often, these network managers gather configuration data from a network site, and provide useful information to a customer. For example, the network manager may poll link layer discovery protocol (LLDP) information of network devices, such as switches. The LLDP information of a switch provides a list of ports or interfaces of the switch along with devices connected to each of the ports. Using the LLDP information, the network manager generates insightful information about the network, network devices, components, etc. At the network level, the insights may include topologies, maps, etc., of the network site. At the device or component level, the insights may include profiles of network devices or profiles of ports of the network devices.

The network manager may be composed of microservices, each performing some specialized computation. For example, the microservices may generate topologies for each switch or create port configuration data for ports for the respective switch using LLDP information. Another microservice may determine profiles for the switches and their ports by consuming the port configuration data and fetching the topologies. Often, multiple threads of such a microservice are spawned after a waiting period to ensure that the microservice fetches the latest topologies.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

The centralized network manager may include microservices, such as device configuration service, topology service, and a profiler service. The device configuration service gathers LLDP information and its updates from switches and creates port configuration data for ports of the switches. Similarly, the topology service consolidates the LLDP information of the switches to create topologies for the switches. A topology for a switch may include information regarding neighboring network device(s) (e.g., a certain number of hops (e.g., five hops) from that switch).

The profiler service determines profiles for the switches and their ports using the port configuration information and topologies. To process the port configuration messages, multiple threads of the profiler service are spawned and executed in parallel. For instance, two worker threads of the profiler service are spawned when a port configuration message is received. A first worker thread (also referred to herein as "consumption worker thread") consumes the port configuration message for a port, and a second worker thread (also referred to herein as "invocation worker thread") is spawned to invoke a callback function, which fetches a topology (for a switch including the port) from the topology service. After fetching the topologies, the profiler service generates a profile for each port and switch and distributes such profile information to the switches.

Often, the topology service takes a certain amount of time (e.g., a few minutes) to create a topology based on the LLDP message received from a switch. Therefore, the invocation worker thread of the profiler service waits for a waiting period, which is equal to the amount of time taken by the topology service. The waiting period ensures that the profiler service fetches the latest topology created by the topology service. Without the waiting period, the profiler service may fetch stale topologies, i.e., topologies computed using older LLDP information, from the topology service.

However, as network sites include a large number of switches, and each switch includes multiple ports or interfaces for device connectivity, the profiler service processes a huge volume of port configuration messages to generate useful network information, such as device or port profiles, for customers. In particular, a consumption worker thread of profiler service of the network manager consumes port configuration messages, and an invocation worker thread of the profiler service is spawned to execute a callback function, which fetches a topology from the topology service of the network manager. However, microservices, such as the profiler service, have constraints or limits on the amounts of resources (e.g., processor, memory, etc.) that can be consumed. As a result, only a limited number of worker threads of the profiler service can be spawned to use the resources for processing the port configuration messages.

The limited number of threads of microservices are not optimally utilized for processing the configuration messages. In particular, the invocation worker thread of the profiler service waits for a waiting period before invoking a callback function that fetches topology from the topology service. In such cases, the invocation worker thread remains inactive during the waiting period and unnecessarily consumes the already-limited resources, which could have been used for consuming new port configuration messages. As an example, if the profiler service has a pool of 100 worker threads, then 50 worker threads may consume port configuration messages and remaining 50 worker threads may be spawned but remain inactive during waiting period. Such inactive threads consume computing and memory resources without actually performing any useful function during the waiting period. In a worse scenario, most or all of the 100 worker threads may be inactive during the waiting period. This causes a shortage of microservice threads available to process the large amount of port configuration messages. Due to the shortage, a lot of the port configuration messages may need to wait for a considerable amount of time, and this leads to a significant delay in processing the messages. In some cases, the port configuration messages may never get consumed and processed by the profiler service.

Additionally, when the consumption worker threads consume port configuration messages for ports of the same switch, then corresponding invocation worker threads execute the same callback function for fetching topology of the switch. For example, the profiler service may receive a first port configuration message for one port of a switch and a second port configuration message for another port of the same switch. The invocation worker threads, when spawned, execute the same callback functions, and fetch duplicate topologies (i.e., topologies for the same switch) from the topology service. As a result, multiple invocation worker threads are spawned to fetch the same topology information, leading to wastage of computing and memory resources on redundancies.

In examples consistent with this disclosure, a microservice calculates timestamps and sets alarms for spawning microservice threads, which execute callback functions for fetching topologies. Examples describe maintaining a record of the calculated timestamps and references to non-duplicate callback functions for each timestamp in a map to avoid wasting computing resources on fetching redundant topologies.

Examples described herein include receiving port configuration data for a port of a switch and calculating a timestamp for a callback function for the switch. Examples include inserting the timestamps and references to callback functions in a timestamp-callback map. Each entry in the timestamp-callback map includes a timestamp and a list of references to unique callback functions to be executed at a time indicated in that timestamp. Examples include setting and maintaining alarms for each timestamp in a timer. The alarm generates a notification when the current time is equivalent to the time indicated in the timestamp. Upon generation of the notification, examples include fetching callback functions paired with the timestamp from the timestamp-callback map and executing the callback functions thereafter using a worker thread.

The list of callback function references in each entry of the timestamp-callback map does not include redundant or duplicate callback functions, i.e., only a single reference to the same callback function is stored. As a result, examples include spawning a relatively fewer number of threads (e.g., invocation worker threads) and, therefore, a relatively smaller amount of computing resources is consumed. Moreover, each invocation worker thread executes a unique callback function referenced in the list. This ensures that the callback functions fetch topologies for different switches from the topology service at a given time, and resources are not used for fetching same or redundant topologies at any given time.

The timestamp-callback map may be implemented in various data structures. In some examples, the timestamp-callback map is a binary search tree (BST), which includes multiple nodes, each storing a timestamp and a list of unique callback functions to be executed at a time indicated in the timestamp. Examples include identifying, in the BST, a node that stores the lowest timestamp, i.e., a timestamp indicating the earliest time-value, and setting an alarm for that timestamp. When the alarm generates a notification, a worker thread executes the callback functions referenced in the node and fetches the topologies for devices associated with the callback functions. After the callback functions specified in the node are executed, examples include identifying another node specifying the next lowest timestamp (i.e., timestamp indicating the next earliest time-value) to fetch topologies from the topology service. Some examples include identifying multiple nodes and setting multiple alarms for those nodes in the BST. For instance, examples may select three nodes including the three lowest timestamps. Such examples include triggering multiple alarms instead of using a single alarm.

Examples described herein ensure that information of unique callback functions are stored in the timestamp-callback map, i.e., multiple references to callback functions that fetch same topologies are not stored separately in an entry of the timestamp-callback map. Therefore, a relatively fewer number of invocation worker threads are spawned, and a fewer number of callback functions are invoked. This reduces the amount of computing resources consumed by microservices (e.g., the profiler service). Hence, examples provide technical improvements, which are primarily achieved in servers of the datacenters. Additionally, as fewer number of threads are spawned for executing callback functions, more threads are made available for receiving newer port configuration messages. This prevents overloading of port configuration messages at the profiler service and also reduces delay in the processing of the large number of port configuration messages received at the profiler service. This ensures that none of the incoming port configuration messages are dropped or left unprocessed. Further, without the unique callback function storage, the topology service may also receive a large influx of requests, creating stress on the topology service and the cloud network infrastructure.

Figure 1:
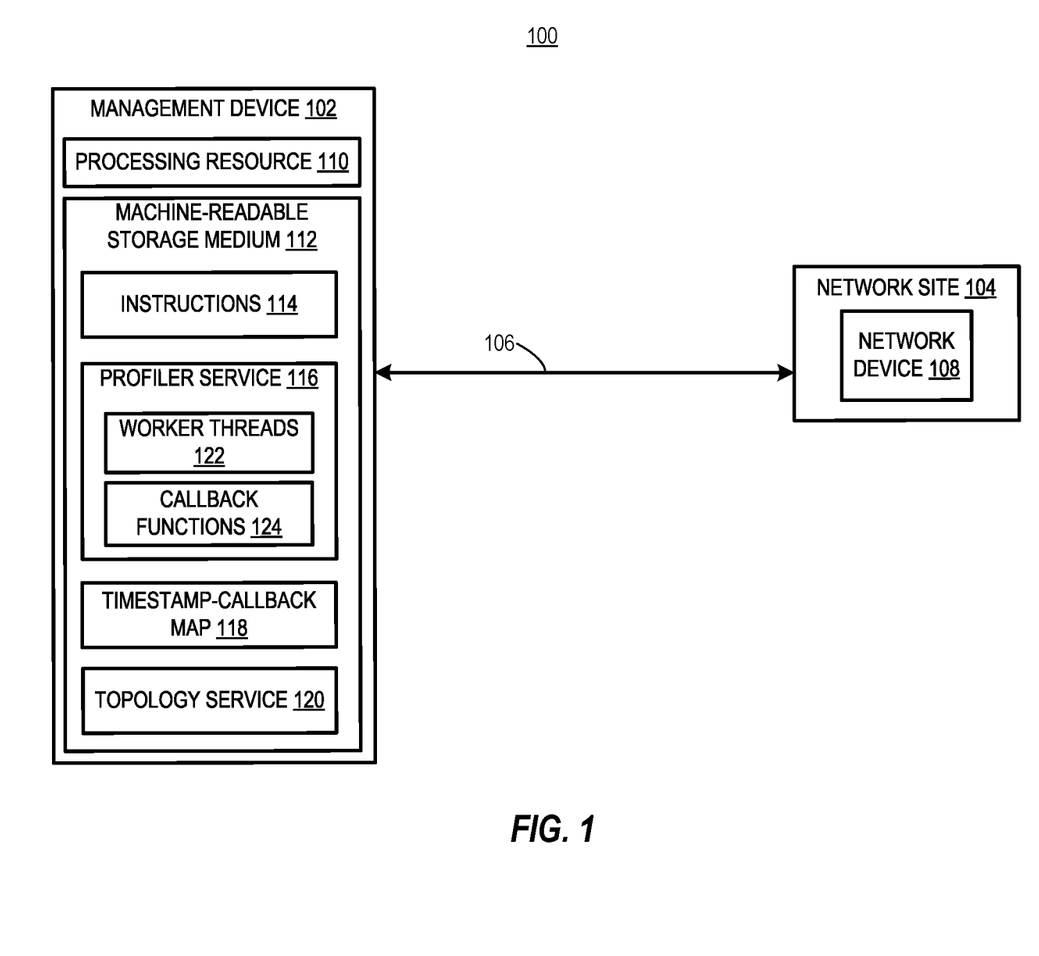
FIG. 1 is an illustration of a network including an example management device facilitating topology fetching using a timestamp-callback map.

FIG. 1 is an illustration of a network 100 including an example management device facilitating topology fetching using a timestamp-callback map.

The network 100 includes a management device 102 and a network site 104 communicatively coupled to each other as depicted via a network link 106. The management device 102 is a computing device (e.g., a server) that manages and orchestrates the network site 104, which includes a plurality of network devices, such as a network device 108 (e.g., a switch). The management device 102 includes at least one processing resource 110 and at least one machine-readable storage medium 112 storing (e.g., encoded with) instructions 114. The machine-readable storage medium 112 also stores a profiler service 116, a timestamp-callback map 118, and a topology service 120. The processing resource 110 executes the instructions 114 and the profiler service 116 to fetch topologies for the network devices from the topology service 120 using the timestamp-callback map 118.

The processing resource 110 receives device configuration information from the plurality of network devices in the network site 104. The device configuration information for the network device 108 includes a list of ports of the device 108 and a list of devices connected to each of those ports. For example, the device configuration information is link layer discovery protocol (LLDP) information, which includes details about ports and devices connected to those ports. In some examples, the processing resource 110 may periodically poll the LLDP information from each network device in the network site. For example, the processing resource may send LLDP requests every 5 minutes to each network device, and receive respective LLDP information in response to the requests. The periodic LLDP information from a network device may include LLDP updates, such as changes to list of neighboring devices connected to the ports of the network device.

The processing resource 110 may process the LLDP information of the network devices to generate component-level configuration information. For example, the processing resource 110 may process the LLDP information of each network device to generate port configuration information for each port of each network device. The port configuration information for a port includes an identifier of the port and a list of devices connected to that port. The processing resource 110 may forward the port configuration information to other microservices or applications responsible for network management.

In some examples, the processing resource 110 forwards the port configuration information to the profiler service 116, which generates profiles for network ports and/or devices. A profile indicates the type of connections for a given port or device. For example, the connection may be workload connections (e.g., virtual machines, applications, etc.) or network layer connections (e.g., core/spine switches). Different worker threads 122 of the profiler service 116 are spawned to process the port configuration information and generate profiles. The processing resource 110 executes a consumption worker thread of the profiler service 116 to consume a port configuration message for a port of the network device 108 and to determine a timestamp for a callback function 124 for the network device 108. The timestamp indicates a time at which the callback function 124 is to be executed.

The processing resource 110 updates the timestamp-callback map 118 by inserting the timestamp and a reference to the callback function 124. The timestamp-callback map 118 is a record of timestamps and callback function references. Each entry of the timestamp-callback map 118 includes a key-value pair, where the timestamps are stored as keys and references to callback functions are stored as values corresponding to the keys. Each entry includes references to unique callback functions. In other words, callback functions for fetching topologies of the same network device are referenced only once in the entry.

The processing resource 110 creates additional worker threads of the profiler service at a time indicated in the timestamp included in each entry of the timestamp-callback map 118. The number of additional worker threads (referred to herein as "invocation worker threads") is equivalent to the number of unique callback functions referenced, corresponding to the timestamp, in an entry of the timestamp-callback map 118. Each worker thread invokes a respective callback function referenced to fetch a topology for a respective network device from the topology service. The profiler service 116 generates a profile for ports and network devices using the topologies and the port configuration information. The management device 102 may provide the generated profiles to a customer or administrator at the network site for network management. Alternatively, the management device 102 may distribute the generated profiles to the network devices.

Figure 2:
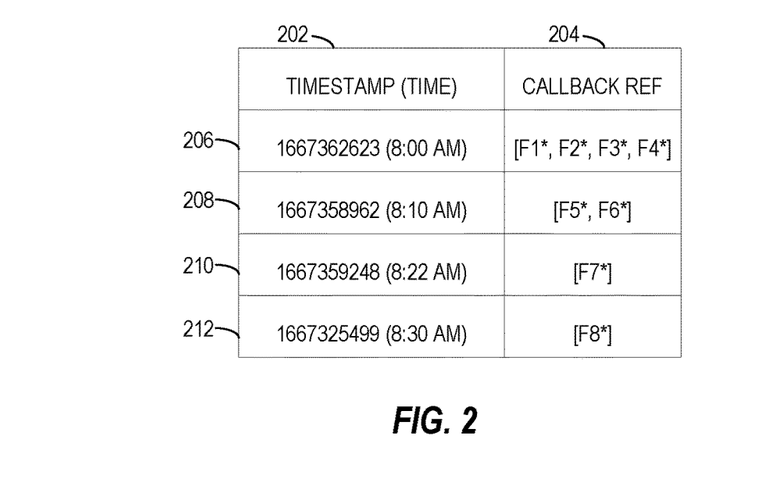
FIG. 2 is an illustration of an example timestamp-callback map.

FIG. 2 is an illustration of an example timestamp-callback map 200.

The timestamp-callback map 200 is a data structure that stores timestamps 202 and references to callback functions 204 (labelled as "CALLBACK REF"). Examples of the timestamp-callback map may be one of a dictionary, a binary search tree, or any other data structure. The timestamp-callback map 200 includes entries 206, 208, 210, and 212. Each entry includes a respective timestamp and a respective list of references to unique callback functions. A timestamp is a string of characters (e.g., numbers, alphabets, or the like) that represents or indicates a time for spawning invocation worker thread(s) of the profiler service and for executing callback function(s). The references to callback functions are pointers, which point to locations (e.g., in storage medium 112 of management device 102 of FIG. 1) storing the callback functions. As shown, the functions referenced in an entry of the timestamp-callback map 200 are not identical. Each function referenced in an entry fetches a topology for a particular network device. For illustration purposes, the time indicated by a timestamp is also shown along with the timestamps 202 (labelled as "TIMESTAMP (TIME)").

Entry 206 specifies a timestamp 1667362623 and a list of references to callback functions [F1*, F2*, F3*, F4*]. The timestamp 1667362623 indicates 8:00 AM and the list [F1*, F2*, F3*, F4*] includes pointers to callback functions F1, F2, F3, and F4. The functions F1, F2, F3, and F4, when executed (e.g., at 8:00 AM), fetch topologies for four different network devices, respectively.

Entry 208 specifies a timestamp 1667358962 and a list of references to callback functions [F5*, F6*]. The timestamp 1667358962 indicates 8:10 AM and the list [F5*, F6*] includes pointers to callback functions F5 and F6. The callback functions F5 and F6 (e.g., at 8:10 AM), when executed, fetch topologies for two network devices, respectively.

Entry 210 includes a timestamp 1667359248 and a list of references to callback function [F7*]. The timestamp 1667359248 indicates 8:22 AM and the list [F7*] includes a pointer to callback function F7. The function F7, when executed (e.g., at 8:22 AM), fetches a topology for a particular network device.

Entry 212 includes a timestamp 1667325499 and a list of references to callback functions [F8*]. The timestamp 1667325499 indicates 8:30 AM and the list [F8*] includes a pointer to callback function F8. The function F8, when executed (e.g., at 8:30 AM), fetches a topology for a particular network device.

Figure 3:
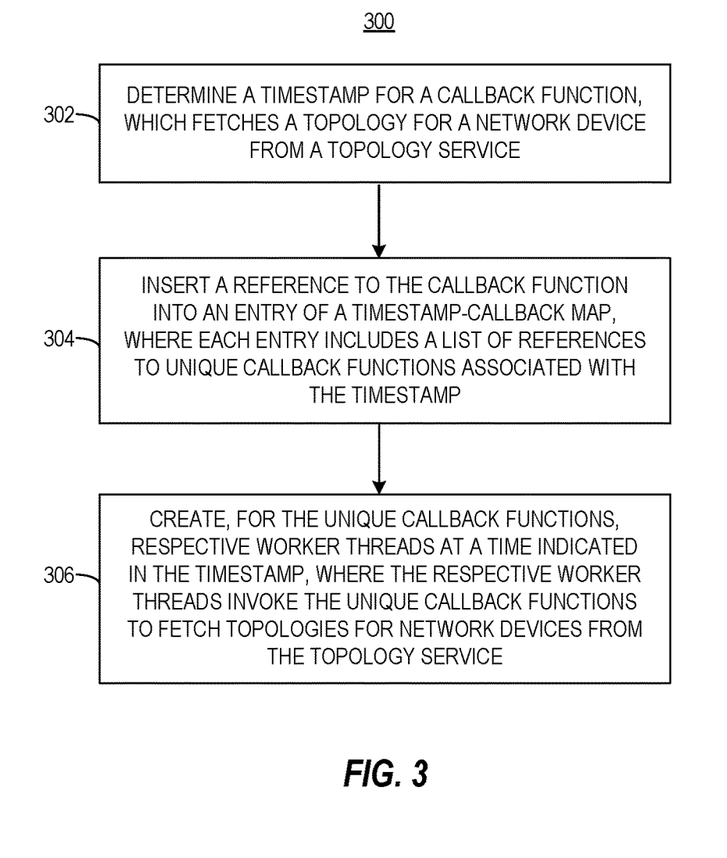
FIG. 3 is a flowchart illustrating an example method to fetch topologies using the timestamp-callback map.

FIG. 3 is a flowchart illustrating an example method to fetch topologies using a timestamp-callback map, such as the timestamp-callback map 200 of FIG. 2.

At block 302, method 300 includes determining a timestamp for a callback function when a port configuration message for a port of a network device is received. For instance, a profiler service spawns a consumption worker thread to receive the port configuration message. After receiving the port configuration message for the port of the network device, the consumption worker thread determines a timestamp for fetching topology for that network device. In some examples, the timestamp for a callback function indicates a predetermined time-value, which is set for a network device (e.g., by an administrator). The administrator may configure a specific time or time intervals at which topology computation for a given network device is performed by a topology service (e.g., topology service 120 of FIG. 1). For example, if an administrator sets 8:30 AM for topology computation, by a topology service, for a network device, then method 300 may determine a timestamp indicating a time-value of 8:30 AM for a callback function, such as callback function F8, which fetches the topology for that network device. Method 300 may use the predetermined time-value for the callback function F8 to determine the timestamp. For example, method 300 determines timestamp 1667325499 for the callback function F8 using the predetermined time value of 8:30 AM. Similarly, method 300 determines timestamp for callback functions that fetch topologies for other network devices. For example, method 300 determines timestamp 1667359248 for callback function F7, timestamp 1667358962 for callback functions F5 and F6, and timestamp 1667362623 for callback functions F1, F2, F3, and F4.

At block 304, method 300 includes inserting, by the consumption worker thread of the profiler service, a reference to the callback function into an entry of the timestamp-callback map. The timestamp-callback map includes a plurality of entries, each specifying key-value pairs of timestamps and references to unique callback functions. Each entry in the timestamp-callback map includes a timestamp as the key and a list of references to unique callback functions as the value. The references to callback functions may include pointers to locations of the unique callback functions.

In some examples, the consumption worker thread searches for an entry storing the determined timestamp in column 202 of the timestamp-callback map 200 and inserts a reference to the callback function in column 204 of the same entry. For example, at block 302, method 300 determines timestamp 1667325499 for a callback function F9, and subsequently, method 300 determines if the timestamp 1667325499 is specified in any entry of the timestamp-callback map 200. Method 300 determines that entry 212 includes 1667325499 and inserts a reference to the callback function F9 in the entry 212, for example. In other examples, if consumption worker thread does not find the timestamp 1667325499 in any of the entries of the timestamp-callback map 200, then method 300 creates a new entry and inserts the timestamp 1667325499 and reference to the callback function in that new entry.

The consumption worker thread of the profiler service stores references to unique callback functions and does not store references to the same or duplicate callback functions. For example, the profiler service may receive two port configuration messages for two different ports of the same network device, and spawn two consumption worker threads for consuming the port configuration messages, respectively. Each of the consumption worker threads determine that the callback functions and the timestamps for the network device are identical. For example, the timestamps may be 1667325499 and the callback functions may be F8. As the timestamps are identical, the consumption worker thread stores a single reference to the callback function instead of storing the reference twice in the timestamp-callback map.

At block 306, method 300 includes creating invocation worker threads for each unique callback function at a time indicated in the timestamp. The invocation worker threads invoke the unique callback functions to fetch topologies for network devices from the topology service.

In some examples, to create invocation worker threads, a management thread of the profiler service sets an alarm for the timestamp in a timer. The timer may be a timer application that measures time, allows setting alarms and generating alarm notifications. In some examples, the management thread may set a respective alarm for each timestamp (specified in a respective entry of the timestamp-callback map). For example, the management thread may set alarms for: 8:00 AM (for timestamp 1667362623), 8:10 AM (for timestamp 1667358962), 8:22 AM (for timestamp 1667359248), and 8:30 AM (for timestamp 1667325499).

Alternatively, the management thread may identify the lowest timestamp in the timestamp-callback map and set an alarm exclusively for that timestamp. The lowest timestamp indicates a time-value corresponding to the earliest time among all the timestamps in the timestamp-callback map. For example, the lowest timestamp in timestamp-callback map 200 may be timestamp 1667362623 indicating time 8:00 AM, which is the earliest time among the time values indicated by other timestamps in the timestamp-callback map 200.

The management thread waits for a notification from the timer. The notification indicates that the time indicated in the timestamp has been reached. In other words, the notification indicates that the current time is equal to the time indicated in the timestamp. When the management thread receives the notification, the management thread fetches the list of references to callback functions corresponding to the timestamp from the timestamp-callback map. For example, on receiving the notification at 8:00 AM, the management thread uses the timestamp (e.g., 1667362623) as key to fetch the list of references to callback functions as value (e.g., [F1*, F2*, F3*, F4*]) from the timestamp-callback map 200.

In some examples, the profiler service determines the number of references in the list fetched from the timestamp-callback map. Based on the determination, the profiler service spawns an equivalent number of invocation worker threads. For example, as the entry 206 specifies four references to callback functions, the profiler service spawns four different invocation worker threads.

Each invocation worker thread executes a respective callback function indicated in the list. The callback function, when executed, sends a request to the topology service. The topology service sends the topologies in response to each request received from the invocation worker thread. As described earlier, the topology service creates the topology for each network device based on the device configuration information received from the network devices. For example, the topology service may poll for LLDP information from network devices of a network site and create topologies for those devices using the LLDP information. Using the fetched topologies, the profiler service may generate a profile for each port of the network device. In some examples, the profile may indicate a role or purpose of the port. For example, the profile may be an "access port" or an "uplink port". Access port may be ports that are connected to workloads or virtual machines, and uplink port may be ports that are connected to core or spine.

Figure 4:
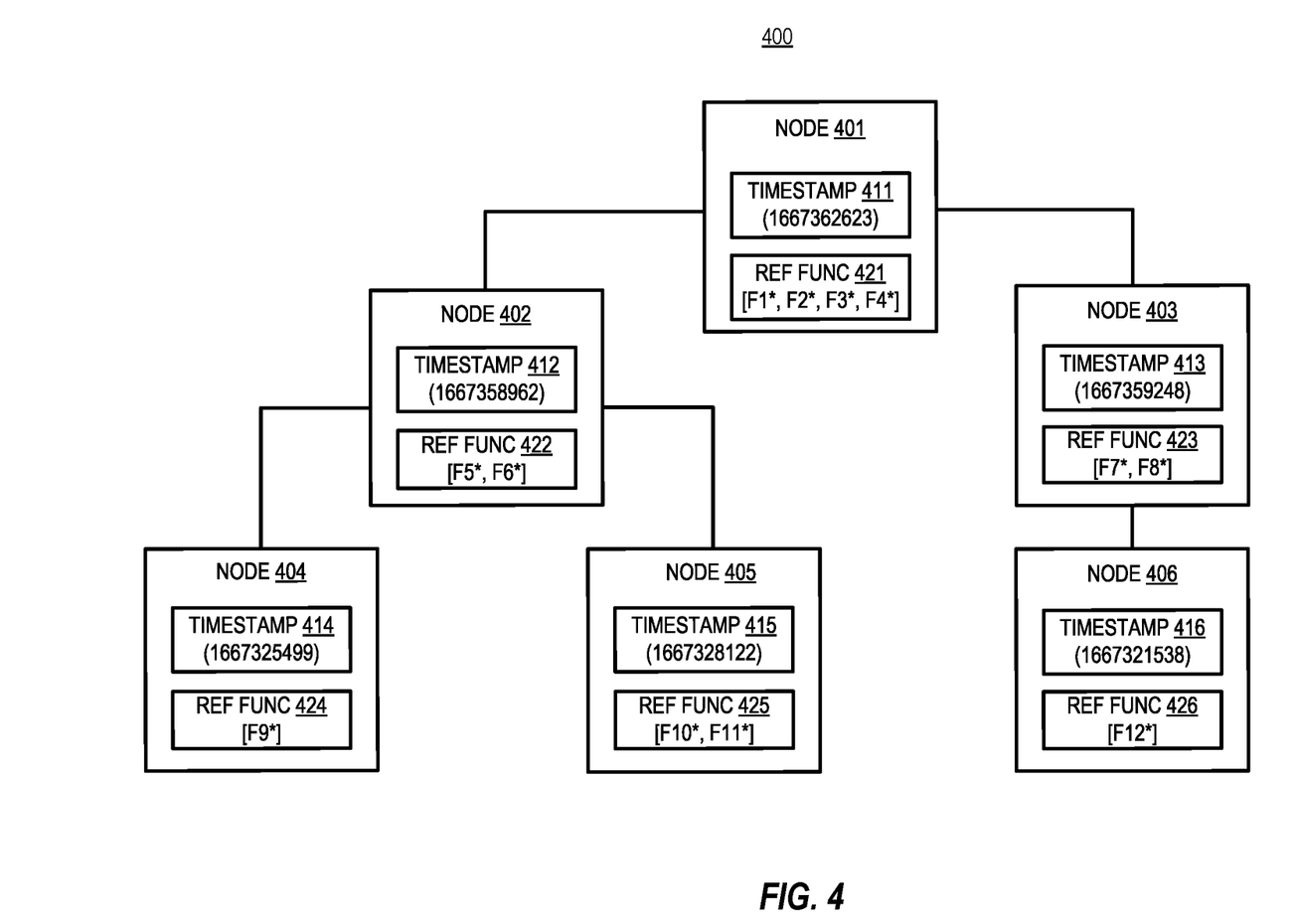
FIG. 4 is an illustration of another example timestamp-callback map.

FIG. 4 is an illustration of another example timestamp-callback map 400.

The example timestamp-callback map 400 is a self-balanced binary search tree, which includes nodes 401, 402, 403, 404, 405, and 406. Each node stores a respective timestamp and a respective list of references to callback functions (labelled as "REF FUNC"). The references to the callback functions are denoted by F1*, F2*, F3*, F4*, F5*, F6*, F7*, F8*, F9*, F10*, F11*, and F12*. As depicted, the node 401 includes a timestamp 411 (1667362623) and a list of references to callback functions 421 [F1*, F2*, F3*, F4*]; the node 402 includes a timestamp 412 (1667358962) and a list of references to callback functions 422 [F5*, F6*]; the node 403 includes a timestamp 413 (1667359248) and a list of references to callback functions 423 [F7*, F8*]; the node 404 includes a timestamp 414 (1667325499) and a list of references to callback functions 424 [F9*]; the node 405 includes a timestamp 415 (1667328122) and a list of references to callback functions 425 [F10*, F11*]; and the node 406 includes a timestamp 416 (1667321538) and a list of references to callback functions 426 [F12*].

A management device (e.g., device 102 of FIG. 1) maintains the timestamp-callback map 400, which is used by the microservices, such as profiler service, to manage network sites. The profiler service inserts a reference to a callback function into a particular node of the timestamp-callback map 400 based on the time for execution of the callback function. For example, when the profiler service receives a port configuration message for a port of a network device, it determines a timestamp for a callback function, which fetches topology for that network device. As an example, the determined timestamp may be 1667890432 for a callback function F13. The profiler service inserts a reference to the callback function (e.g., F13*) to the timestamp-callback map 400 based on the determined timestamp 1667890432.

Figure 5:
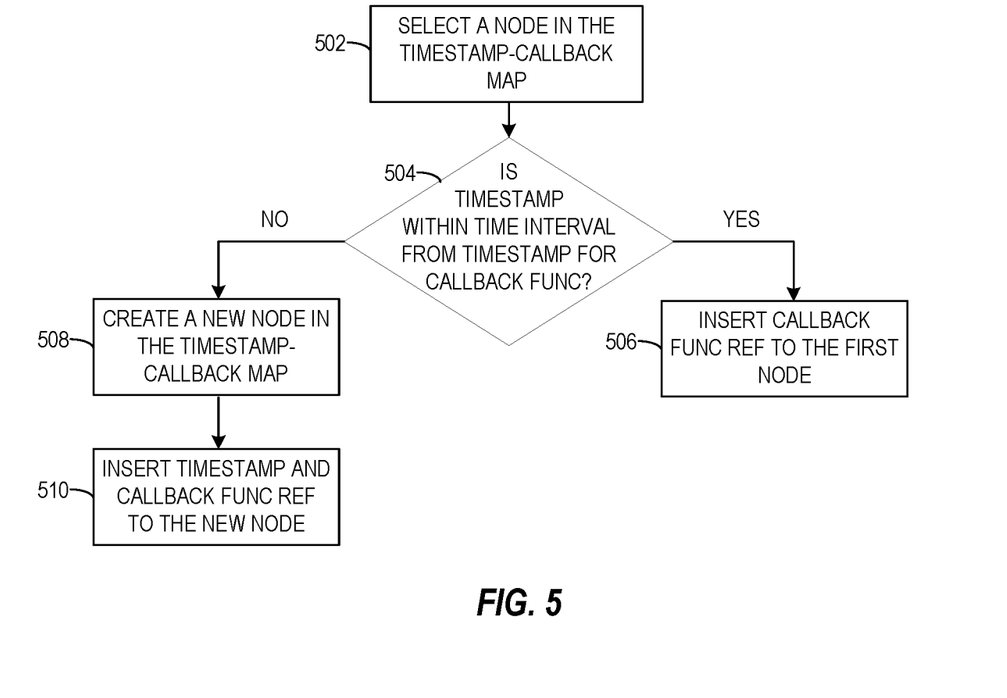
FIG. 5 is a flowchart illustrating an example method to insert a timestamp and a reference to a callback function in the timestamp-callback map.

FIG. 5 is a flowchart illustrating an example method to insert a timestamp and a reference to a callback function in the timestamp-callback map. As an example, the method 500 inserts timestamp 1667890432 and a reference to the callback function (e.g., F13*) to the timestamp-callback map 400 of FIG. 4.

At block 502, method 500 includes selecting a node in the timestamp-callback map 400. The method may include arbitrarily selecting a node or selecting the node at the top of the timestamp-callback map 400. For example, method 500 includes selecting the node 401.

At block 504, method 500 includes determining whether the timestamp 1667362623 in selected node 401 is similar to the timestamp 1667890432 determined by the profiler service for a callback function F13. In some examples, to check similarity between timestamps, method 500 determines whether the time indicated in the timestamp (of the selected node) is within a predetermined time interval from the time indicated in the determined timestamp. If the identified timestamp is within a time interval from the determined timestamp for a callback function, then the timestamps may be similar. For example, if the time-value indicated in the determined timestamp 1667890432 is within a 5 minute interval of (e.g., 2.5 minutes prior or 2.5 minutes after) the time-value indicated in the timestamp 1667362623 of the node 401, then the timestamps may be considered similar, and the method 500 proceeds to block 506.

In some examples, method 500 selects a node that includes a timestamp, which may be identical to the determined timestamp. An identical timestamp may indicate a time equivalent to the time indicated in the determined timestamp. For example, if the determined timestamp is 1667362623, then method 500 may check if the selected node is identical to 1667362623. Based on the check, the method 500 may identify that the timestamp 411 of node 401 includes the timestamp 1667362623, which is identical to the determined timestamp.

At block 506, method 500 includes inserting a reference to the callback function F13* into the node 401 of the timestamp-callback map 400. For example, if the determined timestamp is 1667890432, which is similar to the timestamp 411 1667362623 of node 401, then the method 500 adds a reference to the callback function F13* to the list 421 in the node 401. After the insertion, the list 421 may be [F1*, F2*, F3*, F4*, F13*]. In other examples, method 500 may determine that the reference to the callback function is already stored in the list 421 in the node 401. In such examples, the profiler service may not store the reference to the callback function to avoid storing multiple callback functions that fetch duplicate topologies.

Referring to block 504, if the identified timestamp 1667362623 is not within a time interval from the determined timestamp 1667890432, then method 500 may determine if another node in the timestamp-callback map 400 is present (e.g., by performing the method blocks 502 and 504 in iteration) that satisfies the criteria in block 504. After checking all the nodes, if the timestamp-callback map 400 does not include a node that satisfies the criteria at block 504, then method 500 proceeds to block 508.

At block 508, method 500 includes creating a new node in the timestamp-callback map 400. For example, method 500 may add a node, such as a node branching out from node 403 (not shown in FIG. 4).

At block 510, method 500 includes inserting the timestamp and the reference to the callback function to the new node. For example, method 500 may include the timestamp 1667890432 and the reference to callback function F13* to the new node (not shown in FIG. 4)

Figure 6A:
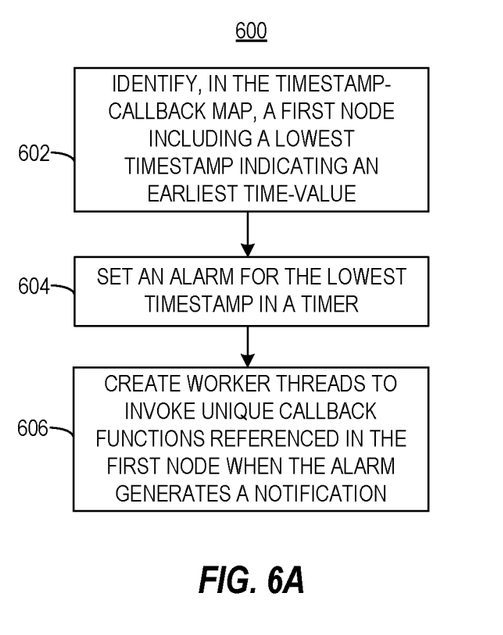
FIG. 6A is a flowchart illustrating an example method to fetch topologies using the timestamp-callback map.

FIG. 6A is a flowchart illustrating an example method 600 to fetch topologies using the timestamp-callback map 400.

At block 602, method 600 includes identifying, in the timestamp-callback map 400, a first node including a lowest timestamp. The lowest timestamp indicates an earliest time-value among all the timestamps included in other nodes of the timestamp-callback map 400. For example, method 600 may determine that node 401 includes the lowest timestamp 1667362623 among all timestamps included in the nodes 401-406 in the timestamp-callback map 400. In other words, the timestamp 1667362623 indicates the earliest time-value among the time-values indicated in the timestamps 411-416.

At block 604, method 600 includes setting an alarm for the lowest timestamp in a timer. For example, method 600 includes setting an alarm for the time indicated in the timestamp 1667362623. If the timestamp 1667362623 indicates 8:00 AM, then method 600 sets an alarm for 8:00 AM.

At block 606, method 600 includes creating worker threads to invoke unique callback functions referenced in the identified node when the alarm generates a notification. For example, management thread of the profiler service receives an alarm notification at 8:00 AM. The alarm notification indicates that callback functions [F1*, F2*, F3*, F4*] paired with the timestamp 1667362623 have to be invoked or executed. The management thread creates four new worker threads (e.g., invocation worker threads) of the profiler service, on receiving the alarm notification. Each invocation worker thread executes the respective callback functions F1, F2, F3, and F4 and fetches topologies for the network devices.

Figure 6B:
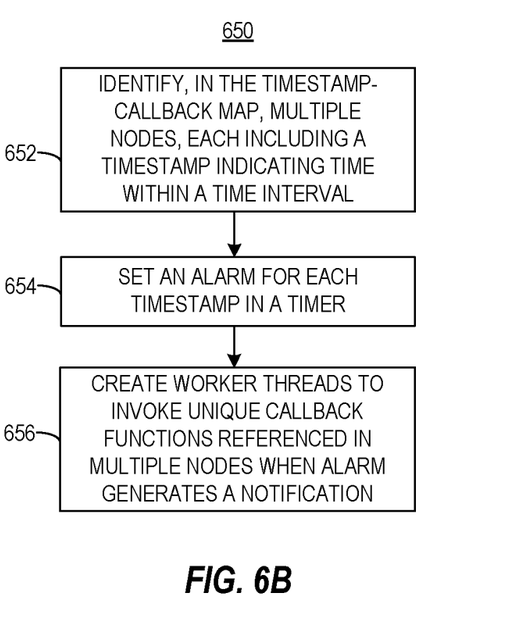
FIG. 6B is a flowchart illustrating another example method to fetch topologies using the timestamp-callback map.

FIG. 6B is a flowchart illustrating another example method 650 to fetch topologies using the timestamp-callback map 400.

At block 652, method 650 includes identifying multiple nodes in the timestamp-callback map 400. Each identified node includes a respective timestamp indicating a time within a predetermined time interval. For example, if the predetermined time interval is 30 minutes, then method 650 identifies the nodes including timestamps, which indicate time values that fall within the next 30 minute time interval. In FIG. 4, if the nodes 401, 402, and 403 include timestamps, which indicate time-values within the next 30 minutes time interval, then method 650 may select the nodes 401, 402, and 403.

In some examples, method 650 includes identifying a certain number of lowest timestamps among all the timestamps in the timestamp-callback map 400. For example, method 650 identifies the three lowest timestamps in the timestamp-callback map 400. In FIG. 4, method 650 may identify that nodes 401, 402, and 403 include the three lowest timestamps (indicating three earliest time-values).

At block 654, method 650 includes setting multiple alarms for the timestamps in a timer. For example, method 600 includes setting an alarm for: the time indicated in the timestamp 1667362623; the time indicated in the timestamp 1667358962; and the time indicated in the timestamp 1667359248. If the timestamp 1667362623 indicates 8:00 AM, the timestamp 1667362623 indicates 8:15 AM, and the timestamp 1667359248 indicates 8:20 AM, then method 600 sets an alarm for 8:00 AM, 8:15 AM, and 8:20 AM.

At block 656, method 650 includes creating invocation worker threads to invoke unique callback functions referenced in the identified node when the notification for each alarm is received. For example, management thread of the profiler service receives an alarm notification at 8:00 AM. The alarm notification indicates that callback functions [F1*, F2*, F3*, F4*] paired with the timestamp 1667362623 have to be invoked or executed. The management thread creates four new worker threads (e.g., invocation worker threads) of the profiler service, on receiving the alarm notification. Each invocation worker thread executes the respective callback functions F1, F2, F3, and F4 and fetches topologies for the network devices. Likewise, management thread receives alarm notification at 8:15 AM (corresponding to 1667362623) and creates two invocation worker threads, which execute respective callback functions F5 and F6 and fetches topologies. Further, management thread receives alarm notification at 8:20 AM (corresponding to 1667359248) and creates two invocation worker threads, which execute respective callback functions F7 and F8 and fetches topologies In some examples, method 650 may set a time-limit for the invocation worker threads. For example, method 650 may set a time-limit of 30 minutes for each invocation worker thread. Upon expiry of the time-limit, method 650 may destroy the invocation thread, i.e., remove resources (e.g., processing or memory resources) allocated to the invocation worker thread. By setting time-limits for invocation worker threads in this manner, examples may ensure that invocation worker threads that are unable to fetch topologies from a topology service (e.g., due to failure at topology service) do not remain active indefinitely, and therefore avoid wastage of resources.

In some examples, the timestamp-callback map may be a binary search tree with a predetermined sliding window period (e.g., 5 seconds). In such a timestamp-callback map, the nodes have a minimum difference of 2.5 seconds between each other. The method 650 may set a time-limit of 30 seconds for each invocation worker thread. Upon expiry of the time-limit, method 650 may destroy the invocation thread, i.e., remove resources (e.g., processing or memory resources) allocated to the invocation worker thread. Examples described herein may set multiple alarms may initiated based on the time-limit. For example, a total of 12 alarms (30/2.5) alarms.

Figure 7:
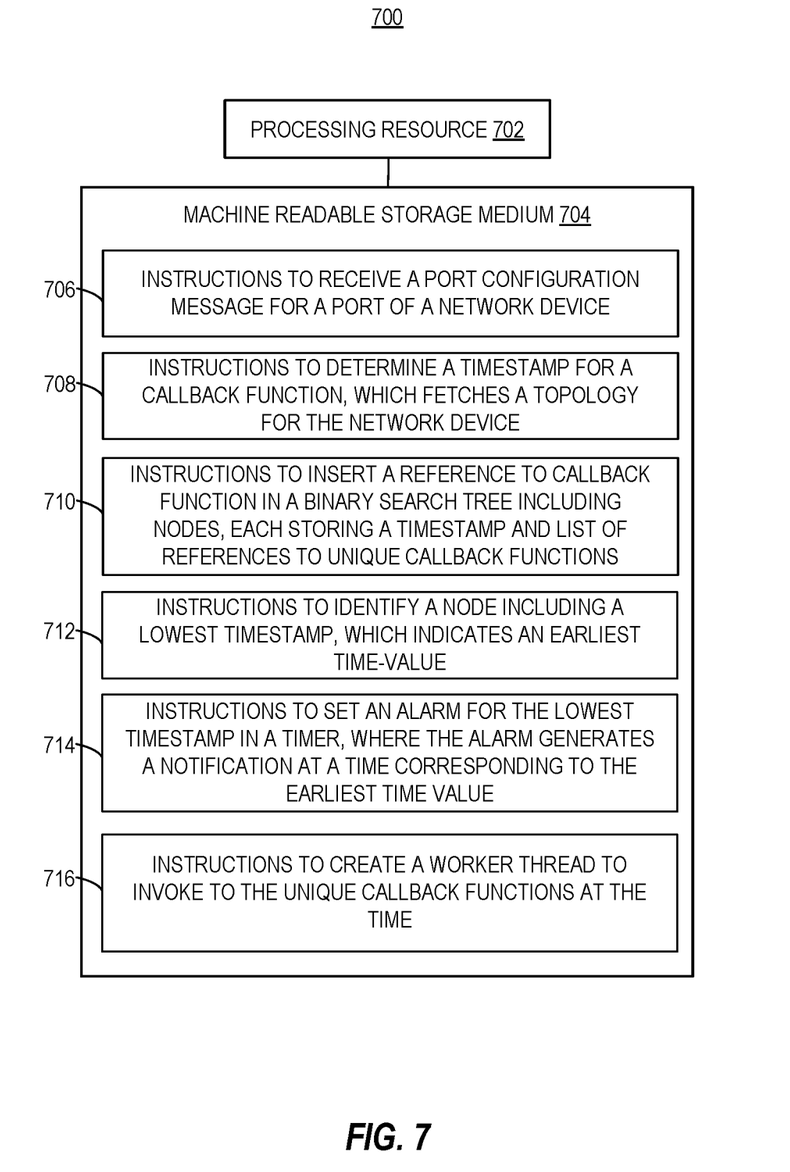
FIG. 7 is a block diagram illustrating a processing resource and a machine-readable medium encoded with example instructions to fetch topologies using a timestamp-callback map.

FIG. 7 is a block diagram illustrating a processing resource 702 and a machine-readable medium 704 encoded with example instructions 706, 708, 710, 712, 714, and 716 to fetch topologies using timestamp-callback map.

The instructions 706, when executed, cause the processing resource 702 to receive a port configuration message for a port of a network device. The instructions 708, when executed, cause the processing resource 702 to determine a timestamp for a callback function, which fetches a topology for the network device. The instructions 710, when executed, cause the processing resource 702 to insert a reference to callback function in a binary search tree including a plurality of nodes. Each node stores a timestamp and a list of references to unique callback functions. The instructions 712, when executed, cause the processing resource 702 to identify a node including a lowest timestamp, which indicates an earliest time-value. The instructions 714, when executed, cause the processing resource 702 to set an alarm for the lowest timestamp in a timer. The alarm generates a notification at a time corresponding to the earliest time-value. The instructions 716, when executed, cause the processing resource 702 to create a worker thread to invoke to the unique callback functions at the time.

As used herein, a "microservice" refers to a small executable unit, such as a container, that performs a specific function of an application. A microservice includes a container image (program logic) and configuration data (configuration objects). An "application" is a collection of microservices, each of which performs a function and communicates with other microservices of the same or other applications via application programming interface (API) calls. A "service" refers to a collection of applications performing multiple functions.

Profiler service refers to a microservice of the centralized network manager that generates profiles for switches or ports of the switches. For example, the profile (also referred to as "persona") of a port may describe a role or purpose of the port. The profile of a switch may describe the hierarchy of the switch is a network (e.g., tier 1, tier 2, or tier 3).

Topology service refers to a microservice of a centralized network manager that generates topologies for network devices. Topology for a network device depicts information of neighboring network device connections for that device. The information may be represented in the form of maps, graphs, tables, or the like, via graphical user interfaces. The topology for a network device may also provide information of a certain number of hops (e.g., 5 hops) from the network device.

A port configuration message, for a given port of a network device, includes the list of network devices connected to that port. The port configuration messages may be in the format of Apache Kafka messages.

A thread refers to a separate, parallel execution of code, such a microservice. A processing resource can execute multiple threads of the same microservice concurrently in a parallel manner. As used herein, "first worker thread" or "consumption worker thread" is a thread of a profiler service for receiving a port configuration message. As used herein, "second worker thread" or "invocation worker thread" is a thread of a profiler service that fetches a topology from the topology service. As used herein, "management thread" is a thread of a profiler service that maintains alarms for timestamps in a timer or clock. Upon generation of alarm notifications, this thread spawns the second worker thread(s) of the profiler service.

A timestamp is a string of characters (e.g., numbers, alphabets, etc.) that represent or indicate a time of execution of a callback function. A timestamp may represent any unit of time, such microseconds, milliseconds, seconds, minutes, or the like.

A callback function is a function passed into another function as an argument. When executed, it sends a request to a topology service to extract topology for a network device.

A timestamp-callback map is a data structure that stores timestamps and a list of references to callback functions.

The data structure may be a key-value pair (e.g., a dictionary), binary search tree, etc. Some examples of the binary search tree implementations of the timestamp-callback maps include Red Black Tree, AVL tree, Splay tree, or other self-balancing binary search trees. The list of callback functions includes references to unique callback functions, i.e., non-duplicate functions.

As used herein, "management device" and "computing device" may be a server, a hyperconverged device, a storage device, a storage component, a desktop or laptop computer, or any other processing device or equipment including a processing resource. In certain examples, the computing device may be or may include a virtualized computing device (e.g., a virtual machine or a containerized application) executing on hardware. In the examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In the examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIG. 1, storage medium 112 may be implemented by one machine-readable storage medium, or multiple machine-readable storage media. Moreover, in certain examples, where the computing device may be a virtual machine or a containerized application, the processing resource and the machine-readable storage medium may represent a processing resource and a machine-readable storage medium of the hardware or a computing system that hosts the computing device as the virtual machine or the containerized application.

Examples of the network may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network may be enabled via a wired (e.g., copper, optical communication, etc.) or wireless communication technologies. In some examples, the network may be enabled via private communication links including, but not limited to, communication links established via wireless, wired (e.g., copper), and the like. In some examples, the private communication links may be direct communication links between the system and the plurality of clients.

In the examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In the examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

Although the present disclosure has been described in detail, it should be understood that various changes, substitutions, and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

What is claimed is:

1. A method comprising:
    determining, by a processing resource, a timestamp for a callback function, wherein the callback function is to fetch a topology for a network device from a topology service;
    inserting, by the processing resource, a reference to the callback function into an entry of a timestamp-callback map, wherein the entry includes a list of references to unique callback functions associated with the timestamp; and
    for the unique callback functions, creating, by the processing resource, respective worker threads at a time indicated in the timestamp, wherein the respective worker threads invoke the unique callback functions to fetch topologies for network devices from the topology service.

2. The method of claim 1, further comprising:
    setting, by the processing resource, an alarm for the timestamp in a timer, wherein the alarm generates a notification at the time indicated in the timestamp.

3. The method of claim 2, wherein creating the respective worker threads for the unique callback functions at the time indicated in the timestamp includes:
    determining, by the processing resource, whether the alarm generates the notification or not; and
    in response to determining that the alarm generates the notification, creating, by the processing resource, the respective worker threads to invoke the unique callback functions at the time.

4. The method of claim 3, wherein invoking the unique callback functions includes:
  extracting, by the processing resource, the list of references to the unique callback functions associated with the timestamp from the timestamp-callback map; and
  executing, by the processing resource, the unique callback functions associated with the timestamps.

5. The method of claim 4, wherein executing the unique callback functions includes:
  sending, by the processing resource, requests to the topology service; and
  fetching, by the processing resource, the topologies for the respective network devices from the topology service.

6. The method of claim 1, further comprising:
  receiving, by the processing resource, port configuration messages for ports of the network devices; and
  generating, by the processing resource, a profile for a port of each network device based on the topologies, wherein the profile indicates a role of the port.

7. The method of claim 1, wherein the reference to the callback function includes a pointer to a memory location of the callback function.

8. The method of claim 1, wherein the timestamp-callback map is a binary search tree, wherein the binary search tree includes a plurality of nodes, each node storing a respective timestamp and a respective list of unique callback functions.

9. A device comprising:
  a processing resource; and
  a non-transitory machine-readable storage medium comprising instructions executable by the processing resource to:
    determine a timestamp for a callback function, wherein the callback function fetches a topology for a network device from a topology service;
    insert a reference to the callback function into a node of a timestamp-callback map, wherein the node includes a list of references to unique callback functions associated with the timestamp;
    for the unique callback functions, create respective worker threads at a time indicated in the timestamp, wherein the respective worker threads invoke the unique callback functions to fetch topologies for network devices from the topology service.

10. The device of claim 9, wherein the timestamp-callback map is a binary search tree, wherein the binary search tree includes a plurality of nodes, each node storing a respective timestamp and a respective list of unique callback functions.

11. The device of claim 10, wherein to insert the reference to the callback function, the processing resource executes one or more of the instructions to:
  from the plurality of nodes, identify a first node including a first timestamp indicating a first time, wherein the first time is within a predetermined interval from the time indicated in the timestamp for the callback function; and
  insert the reference to the callback function to the node.

12. The device of claim 11, wherein the processing resource executes one or more of the instructions to:
  in response to determining that the first time indicated in the first timestamp of the first node is not within the predetermined interval from the time indicated in the timestamp for the callback function:
    create a new node in the binary search tree; and
    insert, in the new node, the timestamp and the reference to the callback function associated with the timestamp.

13. The device of claim 10, wherein the processing resource executes one or more of the instructions to:
  identify, in the binary search tree, a second node including a lowest timestamp, wherein the lowest timestamp indicates an earliest time value; and
  set an alarm for the lowest timestamp in a timer, wherein the alarm generates a notification indicating that time corresponding to the earliest time value is reached.

14. The device of claim 13, wherein the processing resource executes one or more of the instructions to:
  determine whether the alarm generates the notification or not; and
  in response to determining that the alarm generates the notification, create the respective worker threads to invoke the unique callback functions.

15. The device of claim 10, wherein the processing resource executes one or more of the instructions to:
  identify, in the binary search tree, multiple nodes, each including a timestamp indicating a time in a predetermined interval; and
  set an alarm for each timestamp included in the multiple nodes, wherein the alarm generates a notification indicating that the time indicated in the respective timestamp is reached.

16. The device of claim 15, wherein the processing resource executes one or more of the instructions to:
  determine whether the alarm for each timestamp included in the multiple nodes generates the notification or not; and
  in response to determining that the alarm generates the notification, create worker threads to invoke the unique callback functions.

17. The device of claim 9, wherein the processing resource executes one or more of the instructions to:
  set a time-limit for a worker thread; and
  in response to expiry of the time-limit, remove one or more resources allocated to the worker thread.

18. The device of claim 9, wherein the processing resource executes one or more of the instructions to:
  receive port configuration messages for ports of the network devices; and
  generate a profile for each port of the network devices based on the topologies, wherein the profile indicates a role of the port.

19. A non-transitory machine-readable storage medium comprising instructions that, when executed, cause a processing resource of a device to:
  create a first worker thread to:
  receive a port configuration message for a port of a network device;
  determine a timestamp for a callback function, wherein the callback function fetches, from a topology service, a topology for the network device;
  insert a reference to the callback function in a binary search tree, wherein the binary search tree includes a plurality of nodes, each node including a respective timestamp and a respective list of unique callback functions;
  create a management thread to:
  identify, from the plurality of nodes in the binary search tree, a node including a lowest timestamp, wherein the lowest timestamp indicates an earliest time value;

set an alarm for the lowest timestamp in a timer, wherein the alarm generates a notification at a time corresponding to the earliest time value; and in response to the notification, spawn second worker threads to invoke the unique callback functions at the time to fetch topologies for network devices from a topology service.

20. The non-transitory machine-readable storage medium of claim 19, further comprising instructions to:

generate a profile for each port of the network devices based on the topologies, wherein the profile indicates a role of the port; and distribute the profile to the network devices.

\* \* \* \* \*